(12) United States Patent
Shoemaker et al.

(10) Patent No.: US 7,629,764 B2
(45) Date of Patent: Dec. 8, 2009

(54) NONLINEAR MOTOR CONTROL TECHNIQUES

(75) Inventors: Jeffrey W. Shoemaker, Andover, MN (US); Timothy M. Lewis, San Jose, CA (US)

(73) Assignee: BAE Systems Land & Armaments L.P., Arlington, VA (US)

( * ) Notice: Subject to any disclaimer, the term of this patent is extended or adjusted under 35 U.S.C. 154(b) by 398 days.

(21) Appl. No.: 11/702,426

(22) Filed: Feb. 5, 2007

(65) Prior Publication Data

US 2007/0296364 A1 Dec. 27, 2007

Related U.S. Application Data

(60) Provisional application No. 60/764,869, filed on Feb. 3, 2006.

(51) Int. Cl.
*G05B 11/01* (2006.01)
(52) U.S. Cl. .................. 318/629; 318/432; 318/461; 318/632
(58) Field of Classification Search .................. 318/432, 318/434, 625, 629, 632, 461
See application file for complete search history.

(56) References Cited

U.S. PATENT DOCUMENTS

| | | | |
|---|---|---|---|
| 4,507,594 A | 3/1985 | Takemoto | |
| 4,609,855 A | 9/1986 | Andrews | |
| 4,779,031 A | 10/1988 | Arends et al. | |
| 5,038,090 A | 8/1991 | Kawabata et al. | |
| 5,285,378 A | 2/1994 | Matsumoto | |
| 5,642,013 A | 6/1997 | Wavre | |
| 5,646,496 A | 7/1997 | Woodland et al. | |
| 5,760,562 A | 6/1998 | Woodland et al. | |
| 5,771,393 A | 6/1998 | Asghar et al. | |
| 5,836,165 A * | 11/1998 | Champion et al. | 62/6 |
| 6,255,794 B1 | 7/2001 | Staebler | |
| 6,373,219 B1 | 4/2002 | Obara et al. | |
| 6,498,451 B1 * | 12/2002 | Boules et al. | 318/661 |
| 6,580,627 B2 | 6/2003 | Toshio | |
| 6,823,133 B1 * | 11/2004 | Adkins et al. | 388/814 |
| 7,081,730 B1 | 7/2006 | Howard et al. | |
| 7,095,141 B2 | 8/2006 | Groening | |
| 7,109,670 B1 | 9/2006 | Rehm | |
| 2003/0163296 A1 | 8/2003 | Richards | |
| 2004/0052217 A1 | 3/2004 | Anghel et al. | |
| 2004/0061380 A1 * | 4/2004 | Hann et al. | 307/43 |
| 2005/0007044 A1 | 1/2005 | Qiu et al. | |

OTHER PUBLICATIONS

Martin Staebler, *TMS320F240 DSP Solution for Obtaining Resolver Angular Position and Speed*, Application Report, SPRA605, Texas Instruments, Feb. 2000.
Data Device Corporation, *Synchro/Resolver Conversion Handbook*, Fourth Edition, 1994.
Ahmet M. Hava, Russel J. Kerkman, Thomas A. Lipo, *A High-Performance Generalized Discontinuous PWM Algorithm*, IEEE Transactions on Industry Applications, vol. 34, No. 5, Sep./Oct. 1998.
Ahmet M. Hava, Russel J. Kerkman, Thomas A. Lipo, *Carrier-Based PWM-VSI Overmodulation Strategies: Analysis, Comparison, and Design*, Transactions on Power Electronics, vol. 13, No. 4, Jul. 1998.
Heinz Willi Van Der Broeck, Hans-Christoph Skudelny, Georg Viktor Stanke, Analysis and Realization of a Pulsewidth Modulator Based on Voltage Space Vectors, IEEE Transaction on Industry Applications, vol. 24, Jan./Feb. 1988.

* cited by examiner (Continued)

*Primary Examiner*—Rina I Duda
(74) *Attorney, Agent, or Firm*—Patterson, Thuente, Skaar & Christensen, PA

(57) ABSTRACT

The present invention provides a torque loop control method for servomotors utilizing discontinuous pulse width modulation that incorporates measuring the power factor in real time. Also included is a sine wave generator for software-based spectrum analysis.

21 Claims, 11 Drawing Sheets

NONLINEAR MOTOR CONTROL TECHNIQUES

RELATED APPLICATION

The present application claims the benefit of U.S. Provisional Application No. 60/764,869 filed Feb. 3, 2006, which is incorporated herein in its entirety by reference.

GOVERNMENT INTEREST

The invention was made by an agency of the U.S. Government or under a contract with an agency of the U.S. Government. The name of the U.S. Government agency is the U.S. Army and the Government contract number is DAAE 30-92-C-1112.

FIELD OF THE INVENTION

The present invention relates in general to control of a servomotor, and more particularly, to nonlinear techniques for controlling a motor at high speeds.

BACKGROUND OF THE INVENTION

AC synchronous motors and brushless DC motors are controlled through commutation of solid state switching devices connected to their stator windings. These motors can be of the permanent magnet (PM) type in which permanent magnets are used on the rotor instead of rotor windings. Permanent magnet synchronous motors (PMSM) are widely used in motion controls, electric vehicles, and industrial turbo generators (ITG).

For demanding servo applications, having a well-tuned torque loop in an electric motor drive that works optimally under a variety of operating points is highly desirable. In a multi-axis servo application, suboptimal torque loop performance on any axis at any time can adversely affect servo performance in terms of adequately achieving the required velocity response and steady-state behavior.

Tuning the torque loop in an electric motor drive can be a labor intensive exercise that involves expensive equipment and often tuning techniques involve tuning for a particular operating point. However, due to the nonlinear dynamics of the cross-coupling terms in the voltage machine equations, optimal tuning at one operating point can be very suboptimal for a different operating point. For example, the majority of control schemes in industry utilize conventional PI control. These controllers typically have only one set of gains, and are optimized for a single operating point. Operation at any other point tends to be sub-optimal. Since these controllers are based on non-linear three-phase motor equations, their robustness and performance declines with changes in current, speed and inductance. Thus with conventional techniques one is left with a situation where performance and adequate stability margins are not guaranteed across the entire torque versus speed curve for a particular motor. Therefore, there is a need for a system that tunes high speed motors with wide operating ranges.

Servomotor applications typically require that the servomotor be capable of operating at various speeds. Motors can be driven by placing a pulse width modulated (PWM) inverter and PWM controller between the servomotor and the voltage source. Ideally, one would like to choose a PWM switching frequency as high as possible. However, certain parameters put a constraint on just how high the switching frequency can be obtained. There are a number of factors that influence the selection of the PWM switching frequency in three-phase inverters. Among these factors are:

(1) Switching losses;
(2) Inductance of the electric machine;
(3) Control algorithm selection;
(4) Electromagnetic interference (EMI) emissions; and
(5) Electric machine harmonics.

One of the constraints in choosing the frequency is the processing capability of the computing element of the motor drive. The processor quite simply has a finite limit in how fast it can generate a control output. Another constraint is the switching losses. It is well known that switching losses are linearly proportional to the switching frequency. Depending on the switching elements selected in the inverter design, this can have significant impact on inverter efficiency which affects the design of the heat sink and vehicle cooling system sizing. Selection of an appropriate control algorithm with an appropriate PWM switching frequency can add important benefits toward minimizing this impact. There is a sizeable body of research in the technical community that has been focused on developing control algorithms that can lower switching losses and analyzing and comparing these control schemes to determine their impact on switching losses.

To solve the problem, one would like to set up a set of circumstances where the time spent on tuning the torque loop can be minimized while at the same time the techniques guarantee stability margins and performance requirements that hold across the entire torque versus speed curve for the motor under test. This is a complex problem that requires the following multi-layered strategy in order to solve. Thus there is a need to:

(1) Develop compensation for parameters that can change as a function of some known variable. It is known that motor torque constant, for example, changes as a function of current. By compensating for varying parameters in a well-behaved manner, they can be treated as constants for practical purposes and this simplifies the problem to a certain degree to set the stage for the next layer in the strategy.

(2) Develop a means whereby the control technique can decompose the operating regions into manageable partitions and the control system automatically adjusts its parameters according to which region it is operating in.

(3) Develop a set of performance enhancement techniques that can be implemented as needed to further improve performance. These techniques would further enhance torque loop response time, minimize current ripple and improve torque output for a given motor size.

(4) Develop a tool in firmware that can verify the performance enhancements and stability margins without the need for expensive equipment.

SUMMARY OF THE INVENTION

To have good dynamic response for a permanent magnet synchronous motor (PMSM), the controller should be able to control the torque component of the inverter output current to the motor based on the rotor position. The present invention is a method for producing a well-tuned torque loop in an electric motor drive that works optimally under a variety of operating points. Therefore it is a primary objective of this invention to provide a torque versus speed curve partitioning and linearization multi-input multi-output control technique. The torque versus speed curve is partitioned into regions of a predefined speed width. An operating point is selected in the middle of each region. In the voltage machine equations, speed is considered constant with respect to the current dynamics around this operating point for the entire width of each region. Standard linear multi-input multi-output control techniques are used to find the optimal control gains for each region. A lookup table with current and speed indices determine which region the motor is operating in and an algorithm chooses the appropriate controller corresponding to that region.

It is further an objective of this invention to provide a technique for compensating for motor torque constant as a function of current. The technique uses a lookup table that characterizes the motor torque constant nonlinear behavior as a function of current. The current controller can then compensate for the change in flux that is a result from the changing motor torque constant.

It is further an objective of this invention to provide a technique using standard C libraries or Simulink models coded into C code, to generate a sine wave that can be created with programmable frequency, amplitude and outputs. The sine wave generator can be interfaced and embedded anywhere within the control algorithms to inject sine waves and programmed to inject a frequency sweep over a pre-selected frequency range. Data is collected and logged in real-time on the processor card and then transferred and stored in a buffer on a standard PC. The data can be processed or plotted using tools such as Matlab or Excel. This software-based spectrum analyzer takes the place of expensive hardware-based spectrum analyzers and makes troubleshooting and tuning out in the field less costly and cumbersome.

It is further an objective of this invention to provide a new scheme that decomposes the feedback signals to the fundamental and harmonic components through fast Fourier transform's (FFT's) or wavelet transforms. Standard d-q current control has limitations in bandwidth in that it has precise control of the fundamental but not of the harmonics, which act as time-varying current commands. Here, the fundamental and its harmonic components are transformed into multiple d-q reference frames, where its respective controllers perform the control for each of those components. Once the output control signals are computed, they are muxxed together into three-phase control output signals that are converted into PWM voltage input.

DETAILED DESCRIPTION

Figure 1:
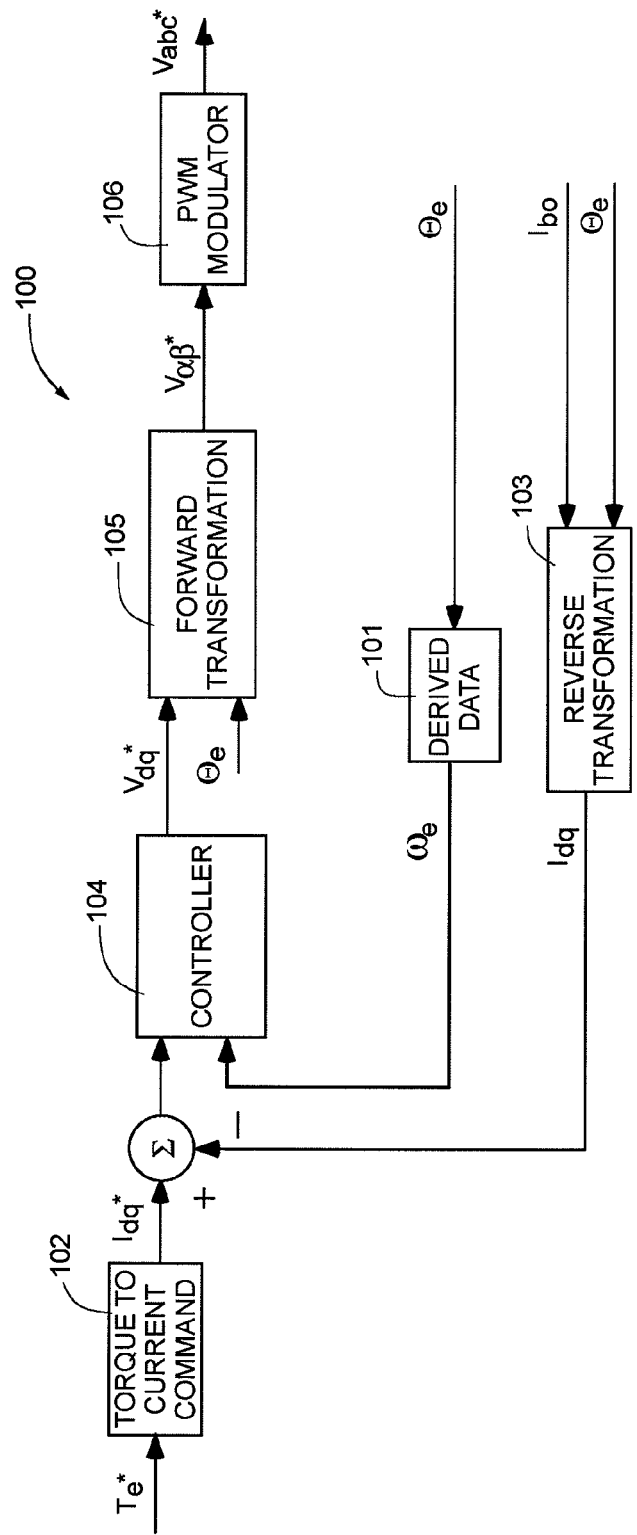
FIG. 1 is a block diagram of the common torque loop for servo motor control.

FIG. 1 shows the common torque loop 100 in block diagram form with the normal input and outputs for PMSM motor control shown. PMSM motors are commonly used for servo drive motors for the following reason; fast dynamic response, compact size, and brushless construction. Since the motor is synchronous, its speed is directly proportional to the frequency of the applied voltage (i.e., there is no rotor slip like an induction machine). The permanent magnets attached to the rotor allow the rotor magnetic field to be produced without the need for slip rings that allow current flow to a wound rotor structure. The permanent magnet rotor structure also allows the rotor to have a lower inertia than a wound rotor motor, thus the motor has a faster dynamic velocity performance.

The motor is intended to be driven from a sinusoidal (time-varying) voltage source thus the stator windings are sinusoidally wound. A shaft sensor is used to shape the voltage waveform incrementally as the rotor position changes. This contrasts with a 'trapezoidal' permanent magnet motor in which the winding are driven with a trapezoidal voltage waveshapes and the shaft sensor only detects 60° electrical sectors.

The PMSM utilizes a control system design specified in this document that performs a reference transformation between the time-varying frame of reference and a non-time varying rotor frame of reference. This allows the motor to be controlled in a manner similar to a DC servo motor and it increases the closed loop performance as compared to a time-varying control system.

As illustrated in FIG. 1, the purpose of the torque loop algorithm is to determine the appropriate voltages to apply to the permanent magnet synchronous motor given a torque command and current and shaft position feedback. The normal processing sequence is:

(1) Calculate the derived rate ($\omega_e$) 101.

(2) Convert the torque command ($T_e^*$) to d and q axis current commands ($I_{dq}^*$) 102.

(3) Calculate the reverse transformation 103 to convert measured currents and resolver inputs to d and q axis currents ($I_{dq}$) referenced to the rotor. These values are the feedback values for the torque controller 104.

(4) Calculate the next d and q axis control voltages ($V_{dq}^*$) using the defined control laws.

(5) Calculate the forward transformation 105 to convert the d and q axis command voltages ($V_{dq}^*$) to stator reference frame □ and □ axis command voltages ($V_{\alpha\beta}^*$).

(6) Calculate the three phase command voltages ($V_{abc}^*$) 106.

The motor voltage equations for a brushless DC machine (PMSM) are:

$$v_q = (r_s + sL_q)^* i_q + \omega_e L_d i_d + \omega_e \lambda_m \quad \text{(Equation 1)}$$

$$v_d = (r_s + sL_d)^* i_d - \omega_e L_q i_q \quad \text{(Equation 2)}$$

with the following definitions:

$v_q$ Quadrature axis voltage (V)

$i_q$ Quadrature axis current (A)

$r_s$ Axis stator resistance (Ω)

$L_q$ Quadrature axis inductance (H)

$\omega_e$ Electrical speed (rad/s)

$\lambda_m$ Rotor magnet flux linkage (V·s/rad)

$v_d$ Direct axis voltage (V)

$i_d$ Direct axis current (A)

$L_d$ Direct axis inductance (H)

and 's' is the Laplacian differential operator. Equations (1) and (2) do not contain a term for iron losses. For integral kW servo motors, iron losses can normally be neglected for dynamic performance. Note also, that (1) and (2) contain a cross-coupling term with regard to $\omega_e$ and $i_{dq}$.

The corresponding torque equation for the motor is:

$$T_e = \left(\frac{3}{2}\right)\left(\frac{P}{2}\right)[\lambda_m i_q + (L_d - L_q) \cdot i_q i_d] \quad \text{(Equation 3)}$$

If the motor contains a saliency (valid for PM synchronous motors with buried permanent magnets) $L_d$ and $L_q$ will not be equal.

Equations 1 and 2 are non-linear as a function of speed due to the state-to-state multiplication of current and speed. When operated open-loop, the PMSM machine equations can be represented as $$v_q = (r_s + sL_q)^* i_q + \omega_e L_d i_d \quad \text{(Equation 4)}$$

$$v_d = (r_s + sL_d)^* i_d - \omega_e L_q i_q \quad \text{(Equation 5)}$$

These equations can be linearized about a small region δ of the operating point. Let $x_1 = i_q$ $x_2 = v_d$ $u_1 = v_q$ $u_2 = v_d \quad \text{(Equation 6)}$ The linearized state equations are $$\begin{bmatrix} \dot{x}_1 \\ \dot{x}_2 \end{bmatrix} = \begin{bmatrix} \frac{-r_s}{L_q} & -w_e \frac{L_d}{L_q} \\ w_e \frac{L_d}{L_q} & \frac{-r_s}{L_d} \end{bmatrix} \begin{bmatrix} x_1 \\ x_2 \end{bmatrix} + \begin{bmatrix} \frac{1}{L_q} \\ \frac{1}{L_d} \end{bmatrix} \begin{bmatrix} u_1 \\ u_2 \end{bmatrix} \quad \text{(Equation 7)}$$

Figure 2:
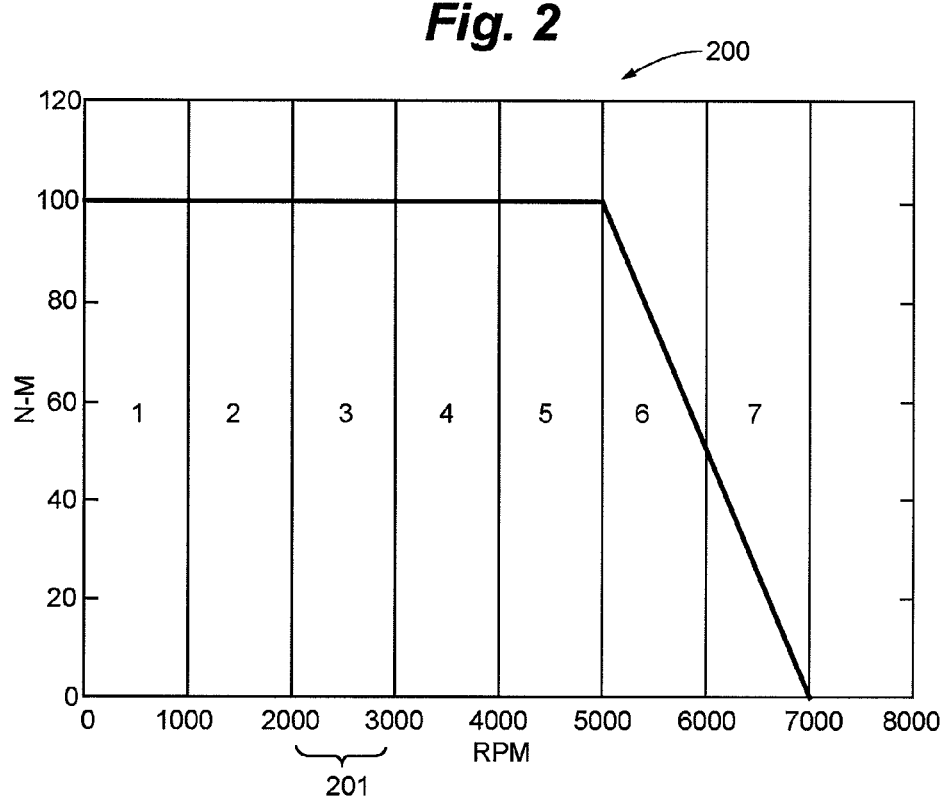
FIG. 2 is a segmented torque versus speed curve for linearization.

Note, however, the linearized equations are only linear for up to δ. Referring to FIG. 2, the torque versus speed curve 200 can then be partitioned into operating regions 201 spanned by δ. The regions can then be defined and referenced by using a lookup table. Each region will then have its own transfer function based on the linearized machine equations applicable to that particular region.

One method to determine the appropriate gain for each newly defined region is to use traditional gain scheduling. Gain scheduling adjusts the proportional gain discretely according to the "schedule", where the schedule is determined in the particular linearized torque/speed region by ad-hoc tuning. This method works better than conventional PI control, but is still sub-optimal even when tuned to operate in the linearized operating region, because the gains are fixed within each region. A second disadvantage to gain scheduling is that the plant dynamics must change slowly as each region is transitioned. If the dynamics change too fast, the abrupt changes which can create instability issues.

Figure 3:
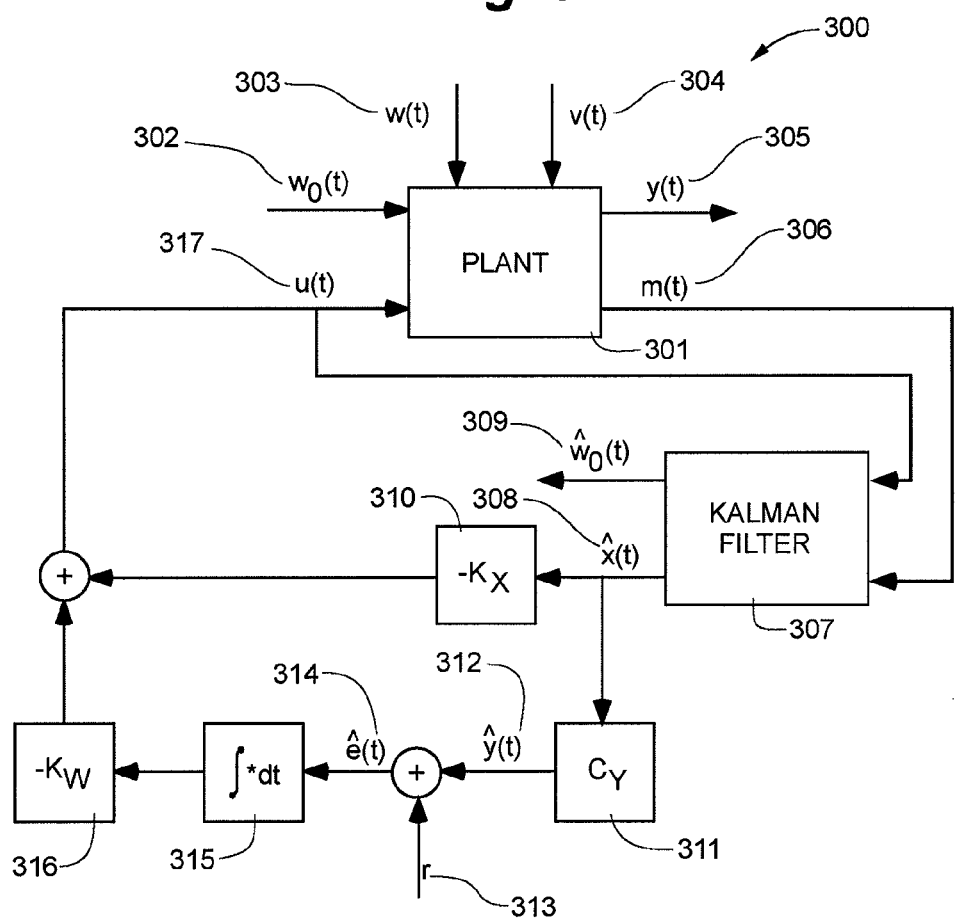
FIG. 3 is a block diagram of an example of an LQG controller with an integrator.

The control strategy of using a multiple input, multiple output (MIMO) linear quadratic Gaussian (LQG) controller for each region provides distinct advantages over gain scheduling since the calculation can be computed by solving the Ricatti equation for each speed region. FIG. 3 provides an example of an LQG controller with an integrator 300. For this type of controller, the control law and estimator are designed separately in accordance to the Seperation Principle. For this segmented linearized regional partitioning scheme, each region has its own unique controller optimized for performance. Instead of using a fixed PI gain according to a schedule, weights on the cost function are scheduled. The controller minimizes the cost function and calculates the optimal gains and estimates by solving a pair of Ricatti equations. Each region's controller can then trade off performance for robustness if needed by performing loop transfer recovery if needed. Loop transfer recovery is accomplished by increasing the spectral density of the fictitious noise disturbance at the control output until acceptable robustness properties are obtained. A new controller is designed with these properties that is suboptimal in terms of performance at the cost of increased robustness.

The linear state-space equations for the plant can be represented as:

$$x(t) = Ax(t) + B_u u(t) + B_w w(t) \quad \text{(Equation 8)}$$

and $$m(t) = C_m x(t) + v(t), \quad \text{(Equation 9)}$$

where x(t) is a state variable, u(t) is the input 317, y(t) is the output 305, w(t) is the disturbance input 303, m(t) is the measurement 306 and v(t) is the measurement noise 304. A, $B_u$, $B_w$, and $C_m$ are the state-space matrices.

The cost function to be minimized can be represented as:

$$J = E\left[\frac{1}{2}x^T(t_f)Hx(t) + \frac{1}{2}\int_0^{t_f} x^T(t)Qx(t) + u^T(t)Ru(t)dt\right] \quad \text{(Equation 10)}$$

where H, Q, and R are weighting matrices. The optimal control law for the plant is found by the equation:

$$u(t) = -K(t)\hat{x}(t) \quad \text{(Equation 11)}$$

where $\hat{x}$ is the estimate of the state variable 308 of the plant 301.

The optimal plant estimator using LQG control is a Kalman filter 307:

$$\dot{\hat{x}}(t) = A\hat{x}(t) + B_N u(t) + G(t)[m(t) - C_m \hat{x}(t)] \quad \text{(Equation 12)}$$

where G is the Kalman gain. The gains K and G are solved by simultaneously solving the pair of Ricatti equations for the controller and the plant.

The gains are used in closed-loop equations of the plant 301, controller and estimator to form the LQG controller 300. The result is an optimal controller in terms of performance in the presence of white noise disturbances. However, since the controller is not optimal in terms of robustness to all disturbances, loop transfer recovery must be performed. This concept of optimal control can be extended from single-input, single-output control (SISO) to multi-input, multi-output control (MIMO) using matrix algebra. In the case of the current controller for a PMSM motor, the inputs are $i_d$, $i_q$ and $\omega_e$, and the outputs are $v_d$ and $v_q$. A unique MIMO current controller can be designed to operate in each operating region of the linearized plant following standard design procedures for designing optimal MIMO LQG controllers.

In order to ensure a smooth transition from one controller to the next as the regions are traversed, the region sizes, as defined by δ, that define the operating regions must be small enough to minimize the abrupt disturbance due to the change in plant dynamics. On the other hand, the region size must be large enough to keep the processing and memory requirements manageable. Since the gains are not fixed, they will adjust themselves to the new plant dynamics in a smoother fashion as compared to a fixed gain response.

In addition to linearizing portions of the torques versus speed curve, standard d-q current control has limitations in bandwidth in that it has precise control of the fundamental but not of the harmonics, which act as control modes that are uncontrollable. Thus, there is an opportunity to exploit more performance out of a PMSM if these control modes could be reached. This control scheme decomposes the current measurement into its spectral components, asserts control over specific components, and reintegrates the control outputs into one control output.

Specifically, the fundamental and its harmonic components are transformed into the d-q reference frame, where its respective controllers perform the control for each of those components. Once the output control signals are computed, they are muxxed together into three-phase control output signals that are converted into PWM voltage input. The entire control scheme is shown in FIG. 4.

Figure 4:
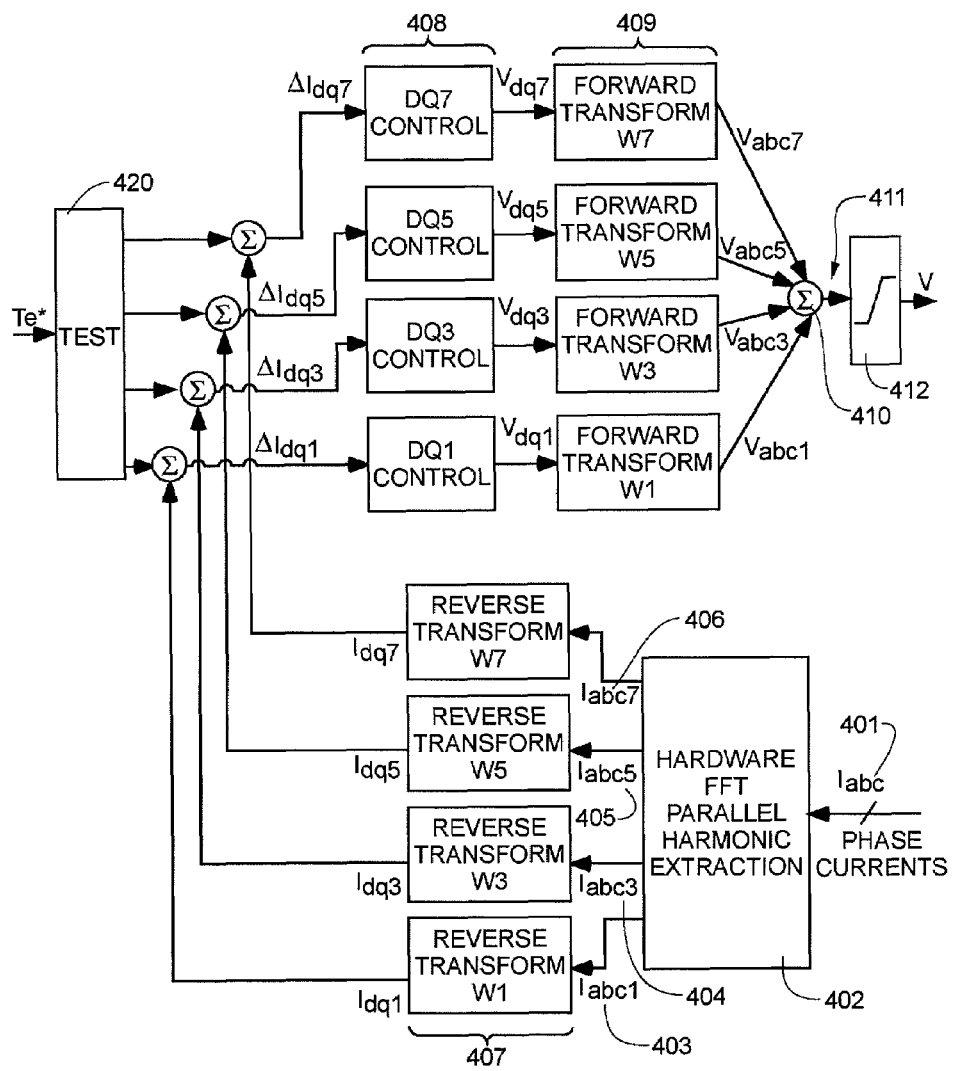
FIG. 4 is a block diagram for the harmonic control method of the present invention.

As illustrated in FIG. 4, the feedback current measurement 401, which has been converted from an analog signal into a digital signal, is decomposed into select harmonic components via Fast Fourier Transforms (FFTs) 402. The harmonic components 403-406 are transformed into the dq reference frame via reverse transformation 407 and summed with $T_e$ 420. Separate MIMO-based current controllers 408 are designed to assert control authority over each harmonic component. Once the control outputs have been calculated, the components are transformed back into the abc rotating reference frame via forward transformation 409. The components are then combined 410 into one control output which is in the form of a voltage command 411 to the inverter 412.

Figure 5:
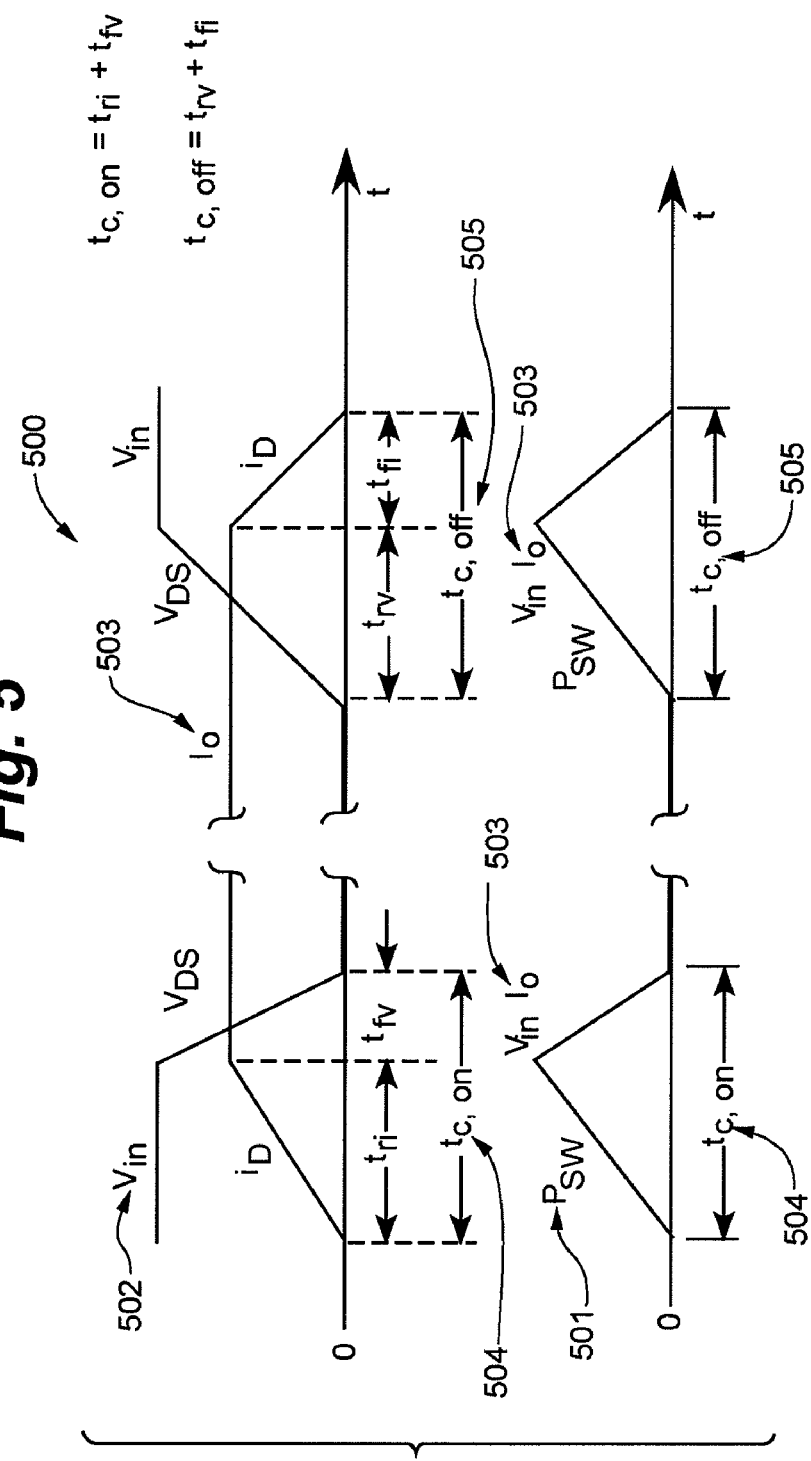
FIG. 5 an illustration of typical switching losses.

DPWM (Discontinuous Pulse Width Modulation) with Power Factor Correction can further improve control performance of the servo motor. DPWM can reduce switching losses by injecting harmonics, called the zero sequence, into a conventional sinusoidal voltage command waveform in such a way that for a finite period of time there are no switching events. For example, the total power losses for a switched-mode inverter can be decomposed at the device level and at the operational level. At the operational level there will be loss contributions due to when the switching components are in the "on" state. The "on" state can be defined as the state at which the switching devices are continuously conducting. These losses are known as the conduction losses. During the time that the switching devices are in the process of switching, there is a finite period of time where there is conduction and voltage drop due to the fact that the switching devices cannot be turned on or off instantaneously. The losses that occur during this switching state are known as the switching losses. FIG. 5 shows an illustration of typical switching losses 500. Switching losses can be calculated according to the equation $$P_{SW} = \frac{1}{2}V_{in}I_O(T_{C,on} + t_{C,off})f_S, \quad \text{(Equation 13)}$$

where $P_{SW}$ is the switching power loss 501, $V_{in}$ is the MOSFET input voltage 502, Io is the MOSFET current 503, $T_{c,on}$ the total time the device is on 504, $t_{c,off}$ is the total time the device is off 505 and $f_s$ is the switching frequency. Note, however, that the losses discussed so far view the MOSFET and diode together as one switching component. Thus the conduction and switching losses can be further decomposed at the component level. At this level of decomposition, there will be conduction and switching losses with respect to the MOSFET, and there will be conduction and switching losses due to the diodes.

The use of Space Vector PWM can reduce these switching losses. Space vector modulation increases the linear output of the inverter by a factor of $2/\sqrt{3}$. This is accomplished by forming special non-sinusoidal line-to neutral voltages that sum to a line-to-line voltage that exceeds linear modulation. Because of the increased voltage, the currents will be lower for a given power level. There is also going to be fewer switching events that will occur due to the higher modulation index that is a result of the higher duty cycle voltage commands. Thus with Space Vector PWM, there will be lower conduction losses and switching losses compared to conventional linear modulation schemes.

Figure 6:
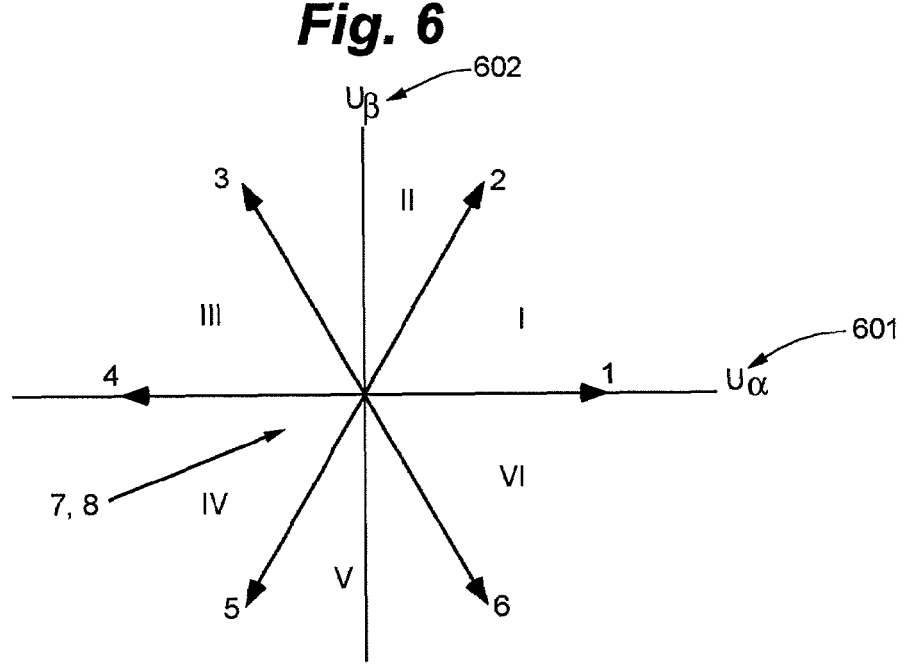
FIG. 6 an illustration of space vector division of the α and β plane.
Figure 7:
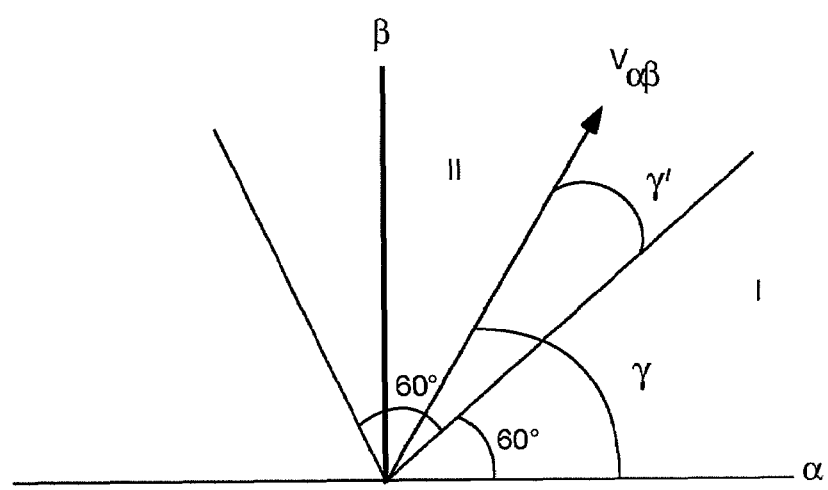
FIG. 7 an illustration of the switching states that correspond to the stationary reference frame voltage vectors.

Space Vector modulation divides the α 601 and β 602 planes into six space vector sectors, represented by Roman numerals, as shown in FIG. 6. FIG. 7 also shows the switching states that correspond to the following stationary reference frame voltage vectors:

Space Vector 1: (+Vas)
Space Vector 2: (−Vbs)
Space Vector 3: (+Vcs)
Space Vector 4: (−Vas)
Space Vector 5: (+Vbs)
Space Vector 6: (−Vcs)
Space Vector 7: Zero-vector (All switches high)
Space Vector 8: Zero-vector (All switches low)

Figure 8:
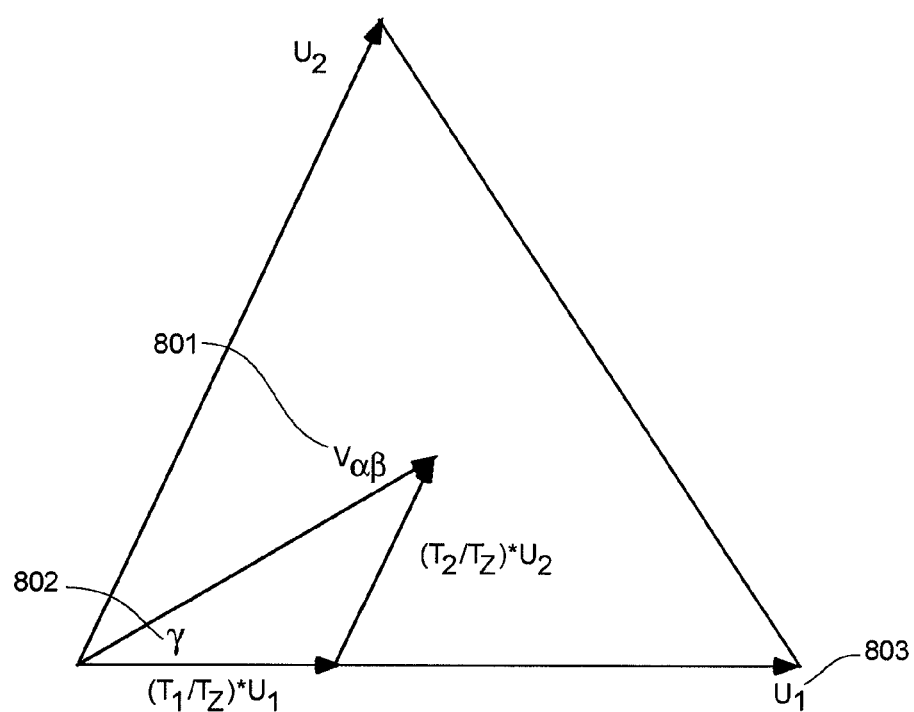
FIG. 8 illustrates how vector V α β forms an angle γ relative to the zero reference for the voltage command vector.

An algorithm can be used to determine the space vector sector based upon the location of voltage command vector. FIG. 8 illustrates how vector Vαβ 801 forms an angle γ 802 relative to the zero reference for the voltage command vector 803. The space vector angle that is utilized by the algorithm, γ' is a relative space vector angle referenced by a space vector sector boundary. Each of the six space vector sectors are offset by 60° relative. Since only the assumed reference frame basis and the voltage command vector is known, the sector is inferred through the indirect knowledge of the space vector angle.

One embodiment of an algorithm that determines space vector sectors is defined by the following pseudo-code:

```
/* Modulation index is truncated */ if ModIndex > 1
ModIndexSV = 1
else
ModIndexSV = ModIndex
/* Space vector sector determination */
/* Note: 0.5 * ModIndexSV = cos(60 deg) * ModIndexSV
*/ if VAlphaCmd >=0
if VbetaCmd >= 0
    if VAlphaCmd > 0.5 * ModIndexSV
        VectorSV = 1
    else
        VectorSV = 2
else
    if VAlphaCmd > 0.5 * ModIndexSV
        VectorSV = 6
    else
        VectorSV = 5
else
if Vbeta >= 0
    if VAlphaCmd > 0.5 * ModIndexSV
        VectorSV = 1
    else
        VectorSV = 2
else
    if VAlphaCmd > 0.5 * ModIndexSV
        VectorSV = 6
    else
        VectorSV = 5
```

Figure 9:
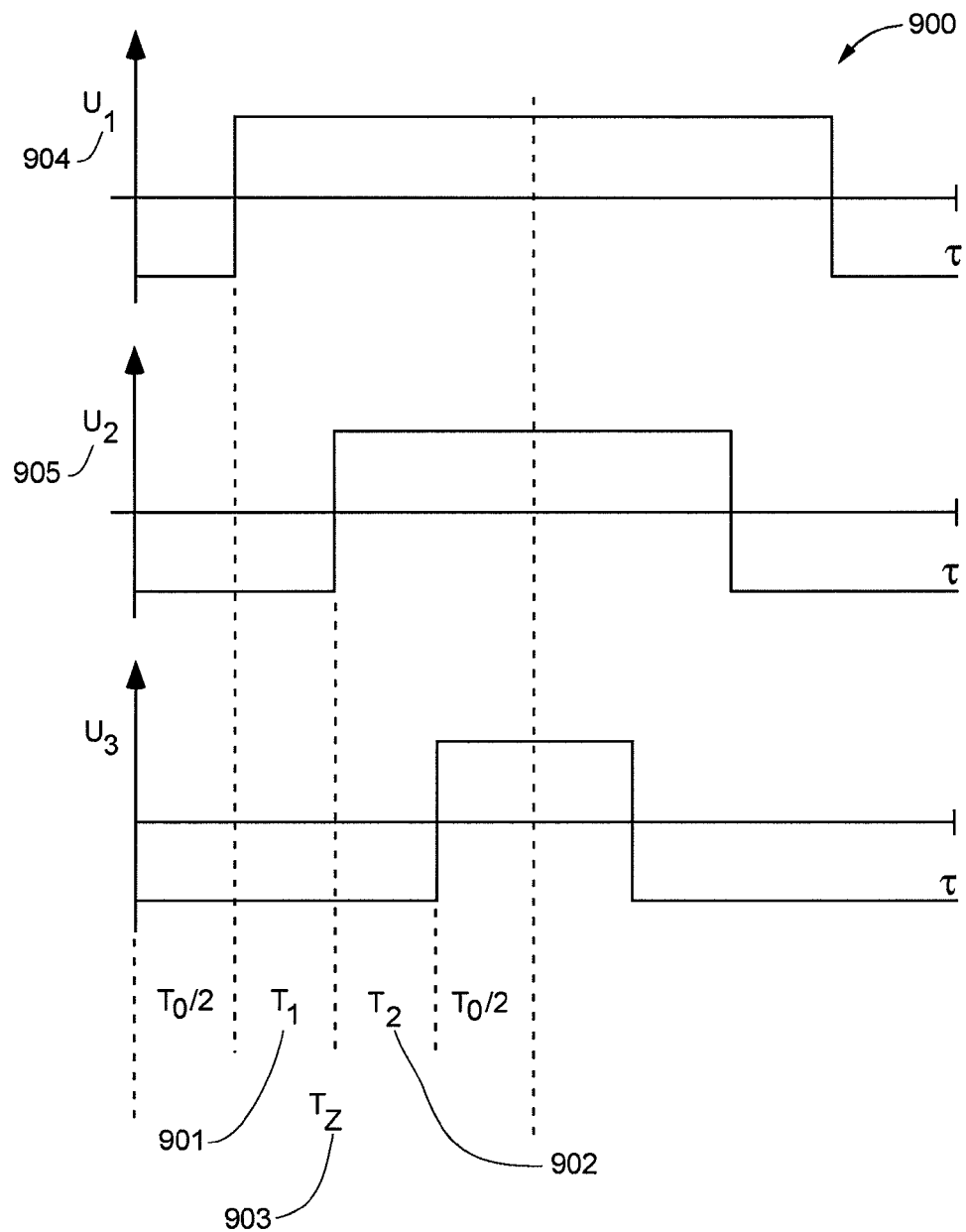
FIG. 9 is an illustration of a space vector pulse pattern.

Referring to the space vector pulse pattern 900 illustrated in FIG. 9 and using space vector sector 1 as an example, the switching times are:

$$\overline{U}_1 \cdot T_1 + \overline{U}_2 \cdot T_2 = \overline{U}_{ref} \cdot T_z$$

where:
T1 901: Half PWM period normalized time duration of the U1 904 space vector
T2 902: Half PWM period normalized time duration of the U2 905 space vector
Tz 903: Half PWM period time duration The timer values $T_1$ and $T_2$ are then:

$$T_1 = T_z \cdot a \cdot \frac{\sin(60° - \gamma)}{\sin(60°)} \qquad \text{(Equation 14)}$$

and $$T_2 = T_z \cdot a \cdot \frac{\sin(\gamma)}{\sin(60°)} \qquad \text{(Equation 15)}$$

with $$T_z = \frac{T_0}{2} + T_1 + T_2 + \frac{T_o}{2} \qquad \text{(Equation 16)}$$

For space vector sector 1, the utilized space vector angle, γ'=γ. For the generalized space vector sections, the angle relationship is:

$$\gamma = \gamma' + (n-1) \cdot 60° \qquad \text{(Equation 17)}$$

or $$\gamma' = \gamma - (n-1) \cdot 60° \qquad \text{(Equation 18)}$$

where n is the space vector section.

Because γ is not known, the terms sin (60°−γ) and sin(γ) must be determined by another method. To avoid using a trigonometric function, the fact that the individual voltage command components are essentially the sine and cosine component with respect to the shaft position's sine and cosine component, is used. Now a vector rotation is just necessary to compute sin (60°−γ) and sin(γ). Substituting in the above relationship:

$$\sin(60° - \gamma') = \sin(60° - (\gamma - (n-1) \cdot 60°)) = \sin(n \cdot 60° - \gamma)$$

and $$\sin(\gamma') = \sin(\gamma - (n-1) \cdot 60°)$$

Expanding using a trigonometric arrangement and realizing that γ=θ (for which we have already computed sin(θ) and cos(θ)):

$$\sin(60° - \gamma') \Rightarrow \sin(n \cdot 60°) \cdot \cos(\gamma) - \cos(n \cdot 60°) \cdot \sin(\gamma) = \qquad \text{(Equation 19)}$$
$$\sin(n \cdot 60°) \cdot \cos(\theta) - \cos(n \cdot 60°) \cdot \sin(\theta)$$

$$\sin(\gamma') \Rightarrow \qquad \text{(Equation 20)}$$
$$\sin(\gamma) \cdot \cos((n-1) \cdot 60°) - \cos(\gamma) \cdot \sin((n-1) \cdot 60°) =$$
$$\sin(\theta) \cdot \cos((n-1) \cdot 60°) - \cos(\theta) \cdot \sin((n-1) \cdot 60°)$$

Figure 10:
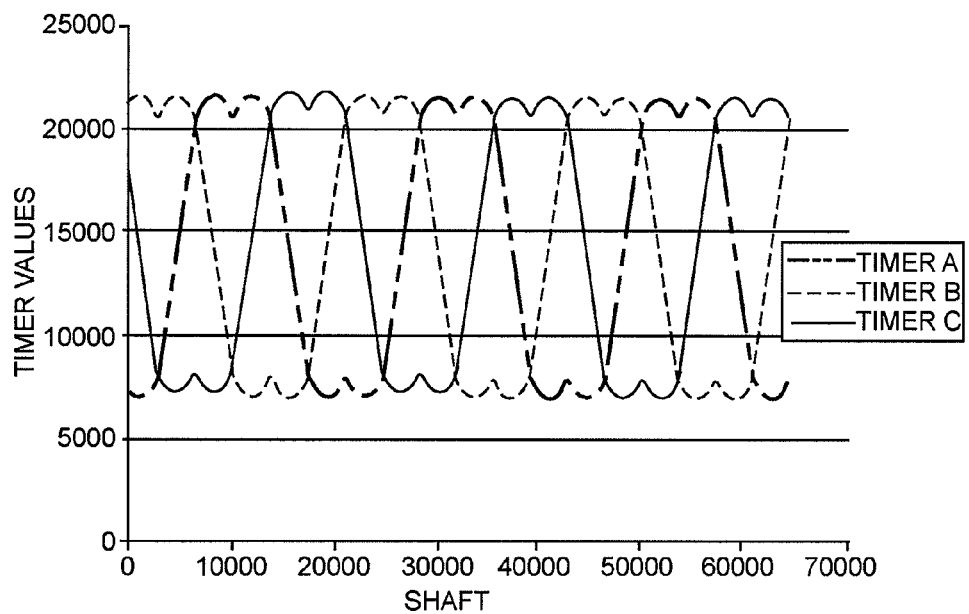
FIG. 10 illustrates the relationship between the space vector times to the PWM timer values.

FIG. 10 illustrates the relationship between the space vector times to the PWM timer values. The generalized vectors U1, U2, and U3 are related to the specific space vector sections in accordance to the following:

Space Vector Sector I: U1=Phase A, U2=Phase C, U3=Phase B

Space Vector Sector II: U1=Phase C, U2=Phase A, U3=Phase B

Space Vector Sector III: U1=Phase C, U2=Phase B, U3=Phase A

Space Vector Sector IV: U1=Phase B, U2=Phase C, U3=Phase A

Space Vector Sector V: U1=Phase B, U2=Phase A, U3=Phase C

Space Vector Sector VI: U1=Phase A, U2=Phase B, U3=Phase C

The pseudo code for the rotation and sector assignment algorithm is:

```
switch (VectorSV)
  case 1:
  /* Calculate timer values for to full PWM cycle */ T1 =
  ModIndexSV * PeriodPWM *
  INV_SIN_60 *
    (SIN_60 * CosTheta - COS_60 * SinTheta)
  T2 = ModIndexSV * PeriodPWM * INV SIN 60 *
    (SinTheta * COS_0 - CosTheta *SIN_O)
  TO 2 = (Tz - T1 - T2)/2
  /* Calculate sector specific timer values */
  TB = TO 2
  TC = TO 2 + T2
  TA = TO 2 + T2 + T1
  case 2: .......
  case 3: .......
  case 4: .......
  case 5: .......
  case 6: .......
```

Figure 11:
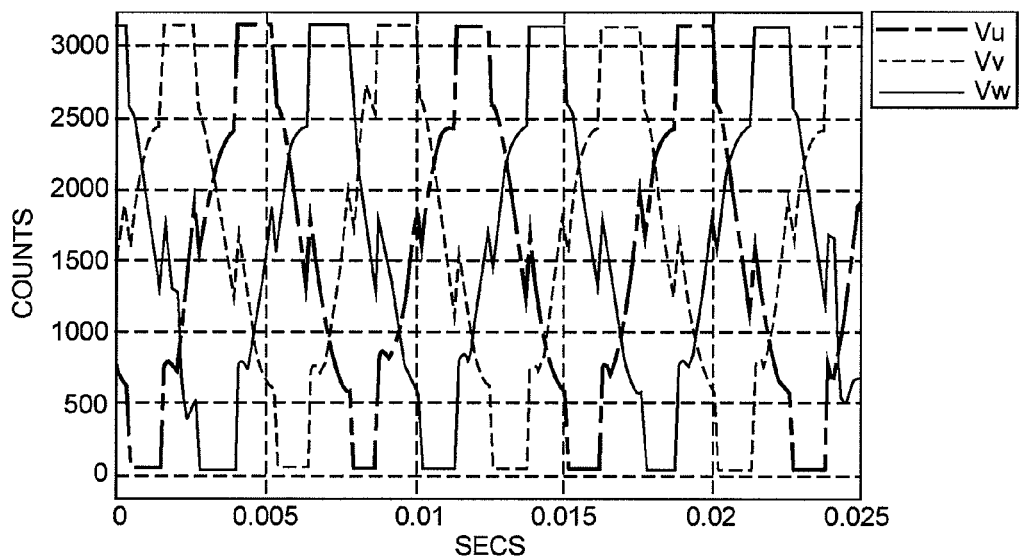
FIG. 11 illustrates resulting output waveform for the PWM timer values.

The resulting output waveform for the PWM timer values are shown in FIG. 11.

DPWM can reduce switching losses over Space Vector PWM by up to 50%. The DPWM algorithm accomplishes this by injecting harmonics, called the zero sequence, into a conventional sinusoidal voltage command waveform in such a way that for a finite period of time there are no switching events. The voltage command is clamped to either the positive or negative rail of the DC bus during this period. This lull in switching events for each phase is timed such that one of the three phases will be in this non-switching mode at anyone time.

For DPWM, assume vector control, and that the forward conversion transformation has occurred such that the orthogonal 2phase rotor-referenced voltage vector, Vdq, is transformed to an orthogonal 2phase electrical winding-referenced rotating voltage vector, $V_{\alpha\beta}$ utilizing the forward Park transformation. Using simple linear modulation, this modulation scheme transforms the orthogonal stationary voltage commands $V\alpha^*$ and $V\beta^*$ to the 3-phase stationary voltage commands by using an inverse of the Reverse Transformations.

For linear modulation, the Forward Clarke transform is applied:

$$\begin{bmatrix} V_{as} \\ V_{bs} \\ V_{cs} \end{bmatrix} = \begin{bmatrix} 1 & 0 \\ -\frac{1}{2} & -\frac{\sqrt{3}}{2} \\ -\frac{1}{2} & \frac{\sqrt{3}}{2} \end{bmatrix} \cdot \begin{bmatrix} V_\alpha \\ V_\beta \end{bmatrix}$$ (Equation 21)

The following pseudo-code illustrates the implementation of this portion of the algorithm:

VaCmd=ValphaCmd $Vb$Cmd=(-1/2)*VAlphaCmd-($\sqrt{3}p$)*VBetaCmd $Vc$Cmd=(-1/2)*VAlphaCmd+($\sqrt{3}p$)*vBetaCmd To determine where the zero sequence signal will be applied relative to the commanded phase voltages, the commanded voltages need to be shifted by a phase angle ψ follows:

$$v_{ax}^* = v_a^* \cos(\psi) - \frac{(v_c^* - v_b^*)}{\sqrt{3}} \sin(\psi)$$ (Equation 22)

$$v_{bx}^* = v_b^* \cos(\psi) - \left( \frac{1}{2} \frac{(v_c^* - v_b^*)}{\sqrt{3}} - \frac{\sqrt{3}\, v_a^*}{2} \right) \sin(\psi)$$ (Equation 23)

$$v_{cx}^* = -v_{ax}^* - v_{bx}^*$$ (Equation 24)

This will ensure that the zero sequence applied to the selected phase voltage lines up with the peak of the respective phase current. Assuming that $$|v^*_{ax}| \geq |v^*_{bx}|, |v^*_{cx}|$$ (Equation 25)

where the actual zero sequence signal itself is represented as:

$$(\text{sgn}(v_a^*)) \frac{Vdc}{2} - v_a^*$$ (Equationn 26)

Then a maximum magnitude test is applied to the phase shifted command voltages. The zero sequence is then added to the voltage commands before the shifting occurred and this becomes the new command voltage where the voltage command that had the maximum amplitude has its voltage command clamped such to the positive or negative DC bus rail such that no switching events occur until another voltage has the maximum magnitude. FIG. 10 shows the resulting PWM command waveforms after the zero sequence has been applied.

Figure 12:
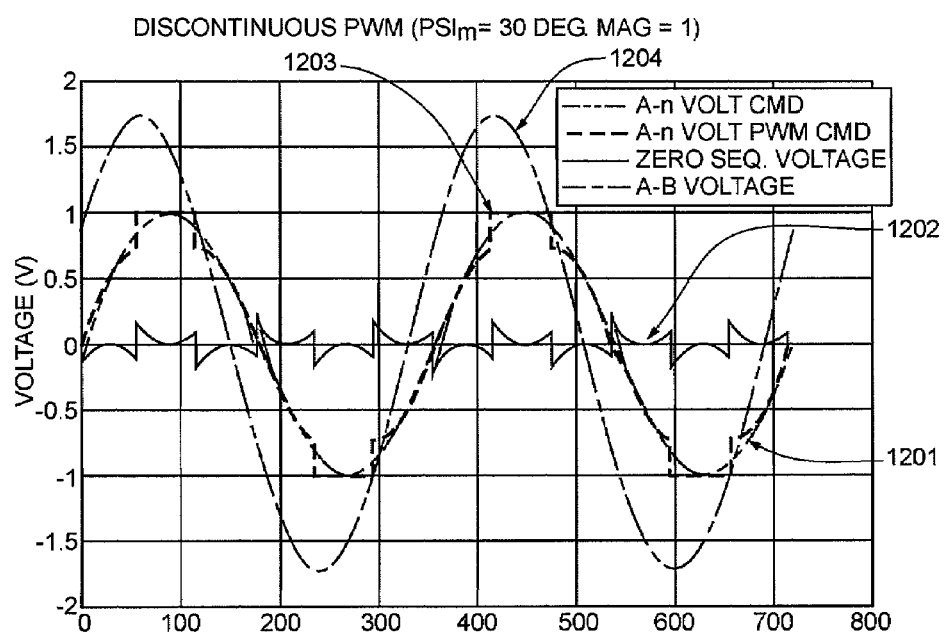
FIG. 12 illustrates the resulting PWM command waveforms after the zero sequence has been applied.

From the waveforms, the clamping of the voltage to the positive and negative rails can be seen. There are also jagged peaks that occur at or around the midpoint of the voltage commands. These are caused by the zero sequence that is generated using equation 13 above. When the zero sequence is added to the sinusoidal voltage command, the waveform in FIG. 11 is the result. This may become more clear by referring to FIG. 12 which shows the sinusoidal voltage command 1201, the zero sequence 1202 and the PWM command voltage 1203 after the zero sequence is added. Note that the line-to-line voltage with respect to phase A and B 1204 is sinusoidal.

In one embodiment of this invention, the DPWM algorithm is applied to a 3-phase PMSM. The algorithm is then modified such that power factor is measured in real-time and the control parameter ψ is adjusted to optimize the reduction in switching losses. The DPWM algorithm transforms the voltages from 2-phase voltages in the rotating reference frame to 3-phase harmonically modified sinusoidal voltages 120 degrees apart from one another. It accomplishes this by using a linear transformation to transform from a-b voltages to 3-phase abc voltages. It then shifts all three voltages by ψ and applies a maximum amplitude test to determine which phase voltage is injected with the harmonic waveform that clamps the voltage command to the positive or negative rail of the DC bus.

The algorithm is implemented with an S-function and is illustrated with the following pseudo-code:

```
// Convert VAlphaCmd and VBetaCmd into 3 command voltages
v_a = VAlphaCmd;
v_b = (-ONE_HALF)'VAlphaCmd -
(SQUARE_ROOT_THREE_DIV_2)'VBetaCmd;
v_c = (-ONE_HALF)'VAlphaCmd +
(SQUARE_ROOT_THREE_DIV_2)'VBetaCmd;
// Commanded Phase Voltages after phase shift by psi_m
v_ax = v_a'cos(psi_m) - ((v_c - v_b)/SQUARE_ROOT-
THREE)'sin(psi_m);
v_bx = v_b'cos(psi_m) + ((v_c -
v_b)/(2'SQUARE_ROOT_THREE)-
SQUARE_ROOT_THREE'v_a/2)'sin(psi_m); v_cx = -(v_ax + v_bx);
// Calculate the magnitude of each phase voltage
a=fabs(v_ax);
b = fabs(v_bx);
c = fabs(v_cx)
// Apply the maximum magnitude test and calculate the zero
sequence voltage
if(a >= b && a >= c)
{ if(v_a> 0)
{
v_O = v_dc'0.5 - v_a;
}
else
{
v_O = -v_dc'0.5 - v_a;
}
else if(b >= a && b >= c)
{ if(v_b> 0)
{
v_O = v_dc'0.5 - v_b;
}
else
{
v_O = -v_dc'0.5 - v_b;
}
else
{ if(v_c> 0)
{
v_O = v_dc'0.5 - v_c;
}
Else
{
v_O = -v_dc'0.5 - v_c;
}
// Add the zero sequence voltage to the original command voltage
v_a_d = v_a + v_O; v_b_d = v_b + v_O; v_c_d = v_c + v_O
//Calculate the line-to-line voltages
    v_ab_d = v_a_d - v_b_d;
    v_bc_d = v_b_d - v_c_d;
    v_ca_d = v_c_d - v_a_d;
// Scale the output to range from +/- 1V peak
    y0[0] = (int)((v_a_d+v_dc'0.5)' (max_pwm/2+2'dead_time+1 ));
    y1[0] = (int)((v_b_d+v_dc'0.5)' (max_pwm/2+2'dead_time+1 ));
    y2[0] = (int)((v_c_d+v_dc'0.5)' (max_pwm/2+2'dead_time+1));
    y3[0] = psi_m;
```

A unique feature of this DPWM control is that the power factor is estimated directly from the measured current from a current sensor and the commanded timer value. The timer value is shifted and rescaled to a voltage value that is normalized with respect to the maximum allowable phase voltage. The current measurement is normalized with respect to the maximum allowable current rating of the amplifier or the motor, whichever is lowest. Both signals are filtered through a low-pass filter of the same order so each output produces smooth sinusoidal waveforms with the same relative timer values with respect to each signal. The power factor is then calculated based on the stored timer values. Then the power factor value is fed into the DPWM algorithm, where the harmonic injection point in the sinusoidal phase voltage command is adjusted based on this power factor value. Thus the entire algorithm insures, based on the quality of the power factor estimate that the center of the voltage clamping occurs at the optimal point which is relative to the peak of the respective phase current.

This algorithm is implemented in an s-function with the following pseudo-code:

```
electrical_period = 1/electricalUrequency;
// Check for zero crossings if(Vv> 0 && Vv_p1 < 0)
{
t1_meas = t1;
t1 = 0.0;
}
if((Iv > 0) && (Iv_p1 < 0)) {
t2_meas = t2;
t2 = 0.0;
}
// Calculate the power factor
if(t1_meas != 0 && t2_meas != 0)
{
if(fabs(t1_meas - t2_meas) < 0.5'electrical_period)
{
//if(t2_meas > t1_meas)
// {
power_factor_new = -pi'electricalUrequency'(t2_meas - t1_meas);
t1_meas = 0.0;
t2_meas = 0.0;
//}
}
//Update the power factor estimate power_factor = power_factor_new;
//Update states Vv_p1 = Vv; Iv_p1 = Iv;
//Increment the counters t1 = t1 + SampleTime; t2 = t2 + SampleTime;
```

The present invention thus provides a method for reducing inverter switching losses through the implementation of a DPWM algorithm. The algorithm has the added feature of maximizing the reduction of switching losses by estimating the power factor in real time from the measured current and commanded voltage so that the harmonic injection signal occurs at the optimal time. It is envisioned that the optimal time is where the center of the voltage clamp in the harmonic injection lines up with the peak of the measured current.

The present invention further includes a built-in frequency response generator. Using standard C libraries or Simulink models coded into C code, a sine wave generator can be created with programmable frequency, amplitude and outputs. The sine wave generator can be interfaced and embedded anywhere within the control algorithms to inject sine waves and programmed to inject a frequency sweep over a pre-selected frequency range. Data is collected and logged in real-time on the processor card and then transferred and stored in a buffer on a standard PC. The data can be processed or plotted using tools such as Matlab or Excel. This software-based spectrum analyzer takes the place of expensive hardware-based spectrum analyzers and makes troubleshooting and tuning out in the field less costly and cumbersome.

Figure 13:
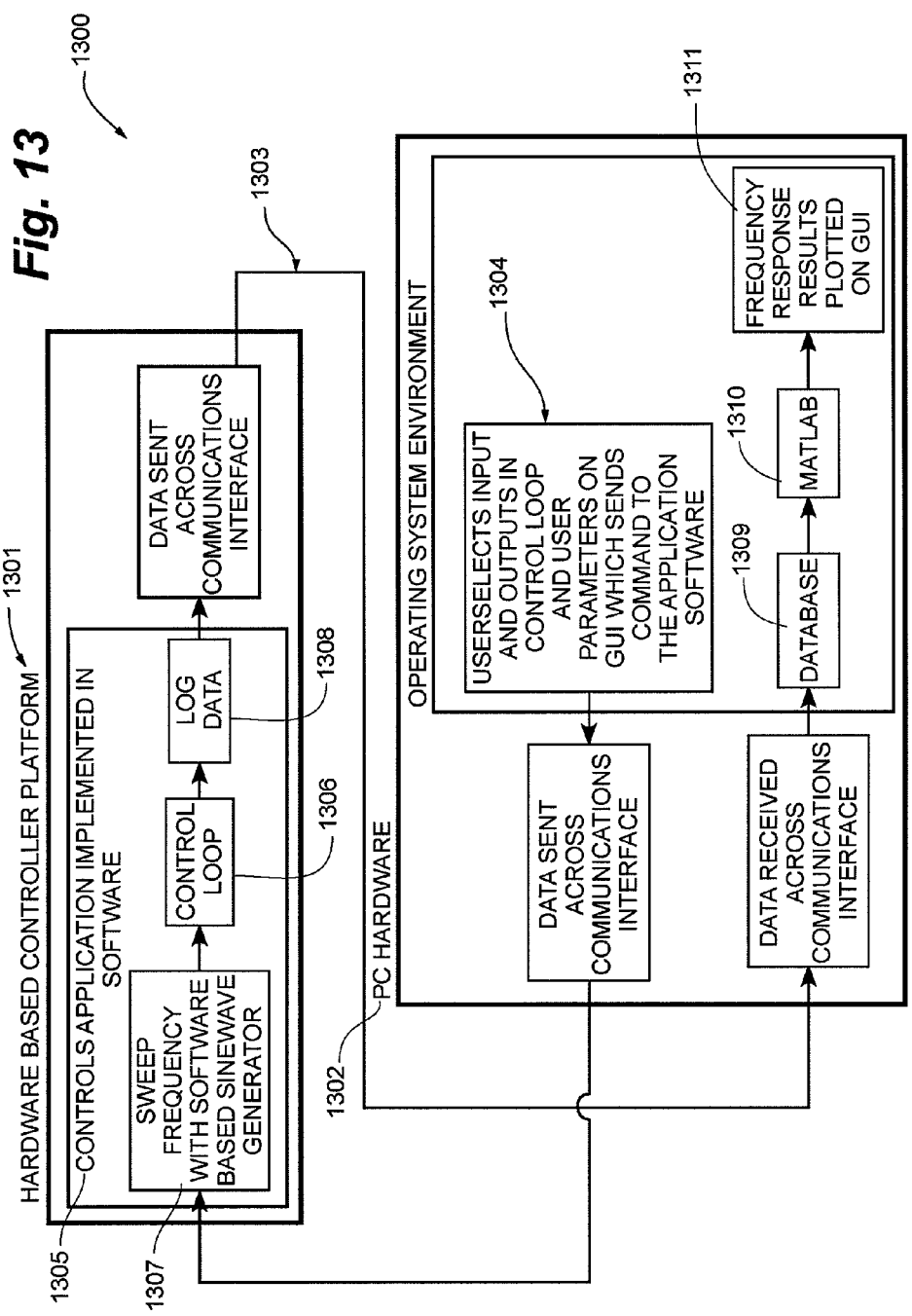
FIG. 13 a block diagram of the frequency response generator of the controller of the present invention.

As illustrated in FIG. 13, a servo motor controller 1301 is interfaced to the PC hardware 1302 via a communications interface 1303 such as GBe (Gigabit Ethernet) for example.

The frequency generation parameters and mode is user selectable on a Graphical User Interface (GUI) 1304 on a conventional PC. From the GUI, the user can issue a command to begin the frequency sweep. Within the servo motor controller is embedded software that contains the application software 1305 that implements the control loops 1306. Also contained in the embedded software is the support structure for executing the frequency response commands. This support structure contains the inputs, outputs and a software-based sine wave generator 1307 that operates based on the commands from the user. By selecting the appropriate mode, the embedded software injects the sine wave signal to the appropriate input and data is sent out to the corresponding output. The data is logged in real-time as the sweep is executing and it is sent across the communications interface back to the PC where the data is stored in a database 1309. The database has an interface to Matlab 1310 which processes the data. The processed data then appears on the GUI 1311 and because it is catalogued and stored in a database, it can be retrieved for future analysis.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein.

The invention claimed is:

1. A method of controlling a high-speed servomotor to attain optimal performance and stability margins across an operational range encompassing the entire torque versus speed curve of the servomotor, comprising:
    partitioning the servomotor's torque versus speed curve into operating regions;
    calculating a set of control parameters for each operating region;
    storing the control parameters for each operating region in a look-up table;
    selecting control parameters from the look-up table based on the current operating region of the servomotor; and
    utilizing various multi-input multi-output controller functions optimized for the current operating region on various harmonic and fundamental components of a feedback signal to produce an output voltage command for controlling the servomotor.

2. The method of claim 1, wherein selection of the control parameters is based on electrical current and speed.

3. The method of claim 1, wherein the feedback signal is decomposed through the use of a transform to produce the various harmonic and fundamental components.

4. The method of claim 3, wherein the transform used to decompose the feedback signal is a fast Fourier transform.

5. The method of claim 3, wherein the transform used to decompose the feedback signal is a wavelet transform.

6. The method of claim 1, further comprising utilizing a loop transfer recovery to increase controller robustness, wherein loop transfer recovery includes:
    increasing the spectral density of a fictitious noise disturbance at the control output until acceptable robustness properties are obtained;
    identifying a set of control parameters at the acceptable robustness level; and
    creating a new current controller with suboptimal performance based on the identified control parameters.

7. The method of claim 1, wherein the set of control parameters include at least one parameter selected from a group including:
    quadrature axis voltage (V);
    quadrature axis current (A);
    axis stator resistance (Ω);
    quadrature axis inductance (H);
    electrical speed (rad/s);
    rotor magnet flux linkage (V·s/rad);
    direct axis voltage (V);
    direct axis current (A); and
    direct axis inductance (H).

8. A method of controlling a servomotor to enhance torque loop response time, minimize current ripple, and improve torque output for a given motor size, comprising:
    obtaining a feedback current measurement;
    converting the feedback current measurement into a digital signal;
    decomposing the feedback current measurement into various harmonic and fundamental components through a transform function;
    transforming the harmonic components into a dq reference frame via reverse transformation;
    controlling each of the various harmonic and fundamental components each with a separate multi-input multi-output current controller to produce a control output for each component;
    converting the control output for each component back into the proper reference frame via forward transformation;
    aggregating the individual control output for each component into a single control output in the form of a voltage command to an inverter; and
    operating the servomotor according to the aggregated control output.

9. The method of claim 8, wherein the transform used to decompose the feedback current measurement is a fast Fourier transform.

10. The method of claim 8, wherein the transform used to decompose the feedback current measurement is a wavelet transform.

11. The method of claim 8, further comprising the use of loop transfer recovery to maintain operational robustness of the servomotor.

12. The method of claim 10, wherein loop transfer recovery includes:
    increasing the spectral density of fictitious noise disturbance at the control output until acceptable robustness properties are obtained;
    identifying a set of control parameters at the acceptable robustness level; and
    creating a new current controller with suboptimal performance based on the identified control parameters.

13. A system for controlling a high-speed servomotor to attain optimal performance and stability margins across an operational range encompassing the entire torque speed curve of the servomotor, comprising:
    an AC synchronous or a brushless DC servomotor;
    a power supply; and
    a motor controller, comprising:
        an analog to digital converter;
        a digital to analog converter;
        a memory, wherein the memory includes:
            control parameters for the operational range, the operational range divided into a plurality of operating regions, each operating region assigned a look-up table, wherein, the operating regions are defined by partitioning the servomotor's torque versus speed curve based on a specified speed range; and various multi-input multi-output controller functions optimized for the current operating region; and a processor, wherein the processor is operable to:

select control parameters and controller functions from the look-up table based on the current operating region of the servomotor; and utilize the various multi-input multi-output controller functions on various harmonic and fundamental components of a feedback signal to produce an output voltage command for controlling the servomotor.

14. The system of claim 13, wherein selection of the control parameters and controller functions is based on electrical current and speed.

15. The system of claim 13, wherein the processor decomposes the feedback signal through the use of a transform to produce the various harmonic and fundamental components.

16. The system of claim 15, wherein the transform used to decompose the feedback signal is a fast Fourier transform.

17. The system of claim 15, wherein the transform used to decompose the feedback signal is a wavelet transform.

18. The system of claim 13, wherein the processor is further operatable to utilize a loop transfer recovery to increase controller robustness.

19. The system of claim 13, wherein the set of control parameters include at least one parameter selected from a group including:
   quadrature axis voltage (V);
   quadrature axis current (A);
   axis stator resistance (Ω);
   quadrature axis inductance (H);
   electrical speed (rad/s);
   rotor magnet flux linkage (V·s/rad);
   direct axis voltage (V);
   direct axis current (A); and
   direct axis inductance (H).

20. A servomotor controller for linearizing control of a servomotor over the entire operational ranges of the torque versus speed curve, comprising:
   a analog to digital converter;
   a digital to analog converter;
   a memory, wherein the memory includes:
      control parameters for the operational range divided into a plurality of operating regions, a look-up table provided for each operating region, wherein, the operating regions are defined by partitioning the servomotor's torque versus speed curve based on a specified speed range; and
      various multi-input multi-output controller functions optimized for the current operating region; and
   a processor, wherein the processor is operable to:
      monitor various servomotor indices including electrical current and speed to determine the servomotor's present operating region;
      retrieve control parameters and controller functions based on the servomotor's current operating region from the look-up table;
      select an appropriate multi-input multi-output current control function optimized for the current operating region;
      calculate a control gain for the current operating region utilizing the multi-input multi-output current control function selected for the current operating region; and
      operate the servomotor according to the optimal control gain for the current operating region.

21. A system for controlling a servomotor to attain optimal performance and stability margins across an operational range encompassing the entire torque versus speed curve of the servomotor, comprising:
   a AC synchronous or brushless DC servomotor; and
   a motor controller which includes:
      a memory, wherein the memory includes:
         control parameters for a plurality of operating regions in a look-up table, wherein, the operating regions are defined by partitioning the servomotor's torque versus speed curve based on a specified speed range; and
         various multi-input multi-output controller functions optimized for each operating region;
      a processor, wherein the processor includes:
         a means for monitoring an electrical current index and a speed index of the servomotor;
         a means for selecting control parameters from the look-up table based on the current operating region of the servomotor; and
         a means for utilizing the various multi-input multi-output controller functions on various harmonic and fundamental components of a feedback signal to produce an output voltage command for controlling the servomotor.

* * * * *